Patented June 19, 1951

2,557,549

UNITED STATES PATENT OFFICE 2,557,549

APPARATUS FOR THE PREPARATION OF SOLIDS CONTAINING LIQUID HYDROCARBONS

Jean Pathus Labour, Washington, D. C., assignor to Gasoline Research Industrial & Commercial Company, Inc., Panama, Panama, a company of Panama Application April 9, 1948, Serial No. 20,153
In France August 25, 1947

3 Claims. (Cl. 18—2.7)

This invention relates to apparatus for the preparation of solids containing dispersed liquid hydrocarbons and, more particularly, to the preparation of such solids, which contain hydrocarbons normally adapted to be used as fuels in the liquid state. Such processes have often been referred to as the "solidification" of liquid fuels in a manner which permits the total regeneration of these fuels from the solids which are produced by the solidification process. In any event, applicants prefer to characterize the process as the preparation of solids containing dispersed liquid hydrocarbons and it should be understood that this terminology is meant to include what has been referred to in other instances as the "solidification" or "congealing" of a liquid fuel itself.

It is an object of this invention to provide an apparatus for carrying out the so-called solidification of liquid hydrocarbons, and particularly of gasoline, by the method disclosed by applicant, Jean Pathus Labour, in the U. S. application filed July 19, 1947, Serial No. 762,194, now abandoned.

It is a further object of this invention to provide an apparatus of the character described which is capable of producing particles of solid material of more or less uniform size and formation.

Still another object of this invention is to provide the apparatus necessary for the fabrication of a solid product of the character described from the basic raw materials such as a suitable colloidal substance in powdered form, water and a liquid hydrocarbon.

Another object of this invention is to provide an apparatus of the character described which is simple both in operation and construction and which is substantially automatic; which is capable of continuous operation; and which produces a product of high quality at a relatively low cost.

With these and various other objects in view the invention consists of certain novel features of construction and operation as will be more fully described and particularly pointed out in the specification, drawings and claims appended hereto.

In the drawings which illustrate embodiments of the device and wherein like reference characters are used to designate like parts:

Figure 1:
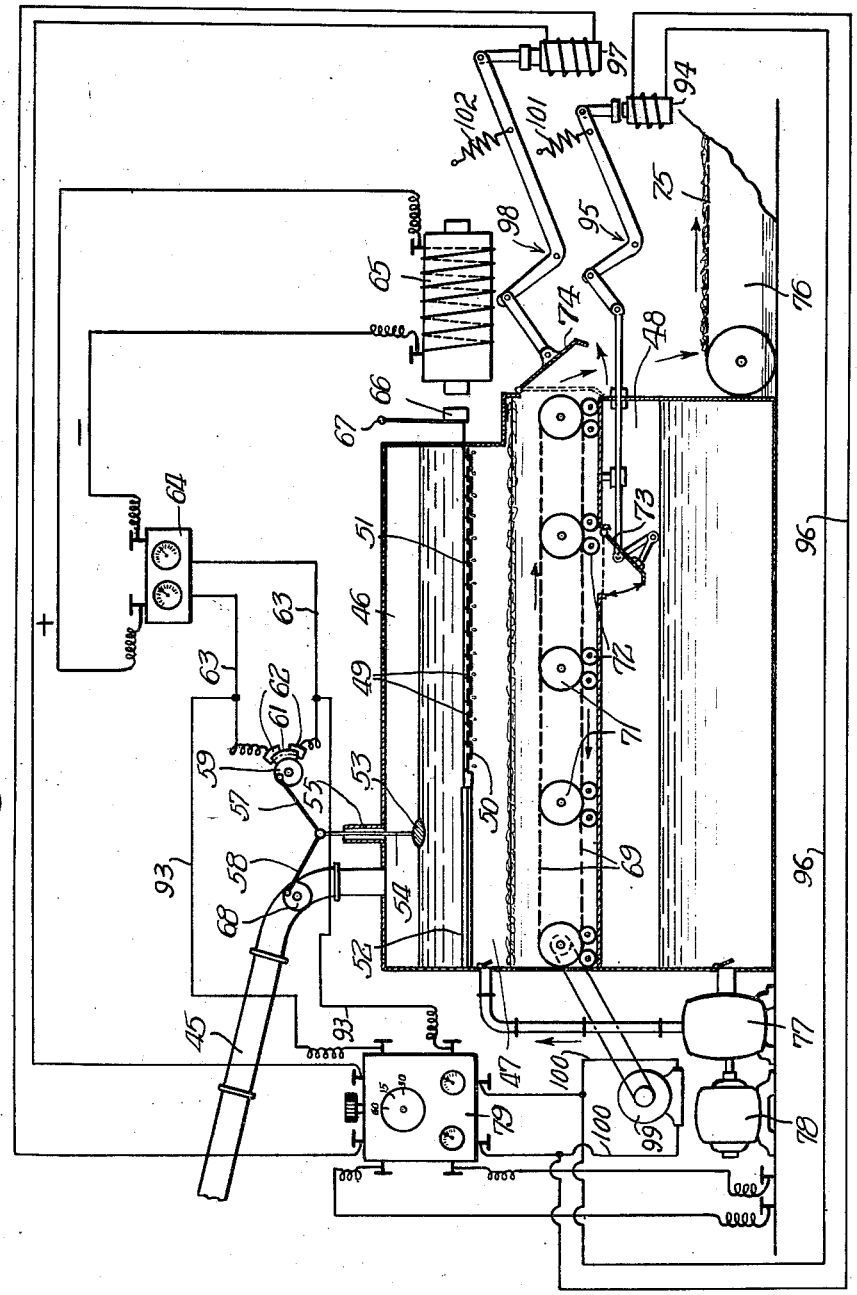
Fig. 1 is an enlarged somewhat diagrammatical view in side elevation and partly in cross section one form of apparatus embodying the invention.
Figure 2:
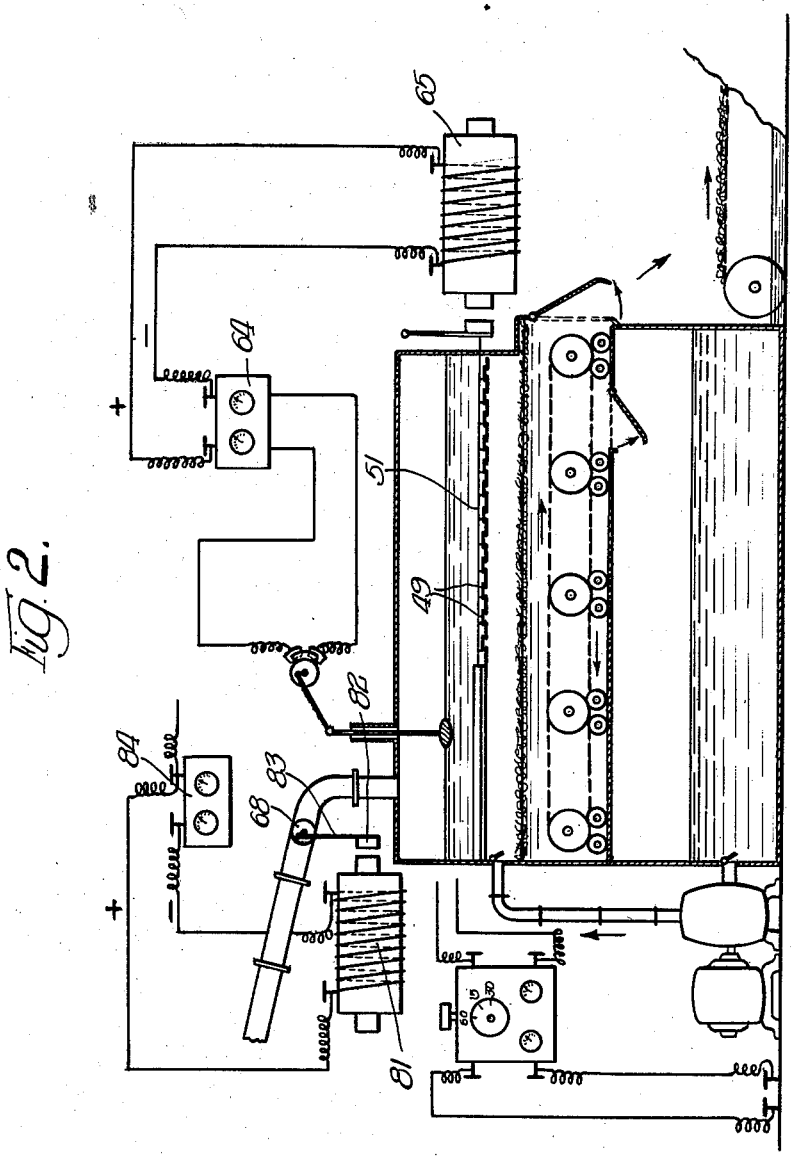
Fig. 2 is a somewhat diagrammatical and fragmentary side elevation of a portion of the apparatus shown in Fig. 1 disclosing a modified form of control for various elements thereof.

Referring now to Figure 1, one form of apparatus is there shown which is adapted to receive a mixture of suitable colloidal solution, water and gasoline which, in turn, may be caused to flow through the conduit 45 to the apparatus for transforming small particles of the emulsion into a solid having a liquid hydrocarbon dispersed therein.

As shown in Fig. 1, the conduit 45 is in communication with a storage chamber 46 which chamber is disposed immediately above the second chamber 47 which is adapted to be filled with a liquid capable of causing the emulsion to assume a solid state. A third chamber 48 is disposed immediately below the other two chambers which is adapted to receive the liquid which forms the bath which is normally disposed in the second chamber 47. The first chamber 46 has a perforated bottom 50 which, in turn, has a plurality of suitable obturators 49 associated with its perforated portions which obturators are adapted to be operated by the arm 51. The arm 51 is, in turn, adapted to be actuated by the armature 66 as described below. A reciprocal movement of the arm 51 will cause relatively small droplets of the emulsion contained in the chamber 46 to fall into the chamber 47, since the obturators 49 will be alternately opened and closed by such motion of the arm 51.

The level of the liquid contained in the chamber 46 is predetermined by the float 53 having the rod 54 associated therewith which is adapted to be slidably mounted in the tube 55 communicating with the top of the chamber 46. The rod 54 has a connecting rod 57 pivotally mounted thereon at its upper extremity and the rod 57 is, in turn, pivotally connected at its opposite end to a rotary switch member 59 having an arcuate contact bar 61 disposed thereon. The contact bar 61 is adapted to cooperate with the two contact points 62 which are electrically connected to two branches of the electrical circuit 63 which, in turn, communicate with a regulator 64. The regulator 64 has a timing mechanism which is adapted to establish an electric current at a predetermined time, which current is caused to pass through the field winding of an electromagnet 65 which is adapted to attract the armature 66 which is pivoted at the point 67. The armature 66 is directly connected to the arm 51, as described above, and the position of the latter may therefore be controlled by an electric current flowing through the field coil of the electromagnet 65.

The rod 54 carried by the float 53 also has a connecting rod 58 pivotally mounted thereon at its upper extremity, the opposite end of the connecting rod 58 being pivotally connected to a valve mechanism 68 disposed in the conduit 55 and controlling the flow of the emulsion through that conduit into the chamber 46. Because of the disposition of the connecting rods 57 and 58 a change in the vertical position of the float 53 and the rod 55 will cause a change in the position of adjustment of both the valve 68 and the switch mechanism 59. Automatic means is thereby provided to control the flow of the emulsion into the chamber 46. It also is obvious that unless the liquid in the chamber 46 is maintained at a certain level no current will flow through the circuit formed by the two branches 63 since the switch mechanism 59 will operate to open this circuit if the level of the liquid falls below a predetermined point.

The chamber 47 which is adapted to contain a bath of solidifying liquid has an endless belt type conveyor 69 disposed therein which is supported by the roller 71 and the roller ring 72. The level of the bath in chamber 47 is normally maintained at a point which causes this conveyor 69 to be completely submerged. The bottom of the chamber 47 has a gate 73 therein which is adapted when opened to allow the liquid forming the bath in the chamber 47 to pass into the chamber 48 directly below. A similar gate 74 is disposed at one end of the chamber 47 and it is normally closed when there is any liquid in the chamber 47. However, when such liquid has been drained therefrom this gate 74 may be opened to permit any material disposed on the conveyor belt 69 to be ejected from the chamber 47. The conveyor 75 has one end disposed adjacent the external surface of the chamber 48 directly below the gate 74 and the end of the conveyor 69 associated therewith. The pump 77 is adapted to cause the liquid used to form the bath in chamber 47 to be moved from the chamber 48 upwardly into the chamber 47. The rotation of the pump is controlled by the motor 78 which is, in turn, activated by the automatic time switch 79 to a suitable electric circuit connecting it therewith.

In actual operation the solidifying apparatus functions in the following manner. The valve 68 permits the paste-like emulsion to flow through the conduit 45 into the chamber 46, which flow continues until the emulsion has reached a predetermined level in that chamber. When the level of the emulsion has reached this point the valve 68 is closed by operation of the float 53, rod 54 and the connecting rod 58. In the same fashion, connecting rod 57 operates the switching mechanism 59 to close the electrical circuit 63. The closing of this circuit activates the regulator 64 which, in turn, controls the energizing of the electromagnet 65. This latter member is energized in such a way that it gives a reciprocating motion to the arm 51 which, in turn, operates the obturators 49 which alternately open and close the orifices in the bottom 50 of the chamber 46. In this way drops of the emulsion are formed and caused to fall into the bath of solidifying liquid contained in the chamber 47. On contact with the bath of solidifying liquid these drops are changed from a pasty liquid to a solid.

The electrical circuit 93 connects the automatic time switch 79 across the switching mechanism 59, so that it is activated whenever the regulator 64 is activated. Switch 79 may be adjusted so that after the elapse of a suitable time, which may be determined by experimentation and which may be, by way of example, approximately 10 minutes, the automatic time switch 79 causes the gate 73 to open, through the energizing of the electromagnet 94 and the activation of the train of levers, indicated generally by the numeral 95 in Figure 1. An electromagnet 94 is energized through the circuit 96, which connects it to the time switch 79. The bath of solidifying liquid then drains into the chamber 48 and drops of the emulsion which have been rendered solid settle on the conveyor belt 69 as the level of the solidifying liquid subsides. This latter device is then activated by the time switch 79 and at the same time the gate 74 is opened by the energizing of the electromagnet 97, which, in turn, activates the train of levers, indicated generally by the numeral 98 in Figure 1. The conveyor belt is, in turn, activated by the energizing of the electric motor 99 through the circuit 100, which connects the motor 99 to the switch 79. The conveyor belt 69 thus causes the solidified drops of material to fall through the gate 74 onto the conveyor belt 75 and any remaining solidified liquid is allowed to drain therefrom. The gates 73 and 74 are subsequently closed by the energizing electromagnets 94 and 97, and the operation of the spring members 101 and 102, respectively. Motor 78 is then energized by the time switch 79 which, in turn, activates pump 77 and causes the solidifying liquid to be moved from the chamber 48 into the chamber 47 immediately above. The cycle of solidification of the emulsion in the form of relatively small spheres or droplets is then reinstituted.

Figure 3:
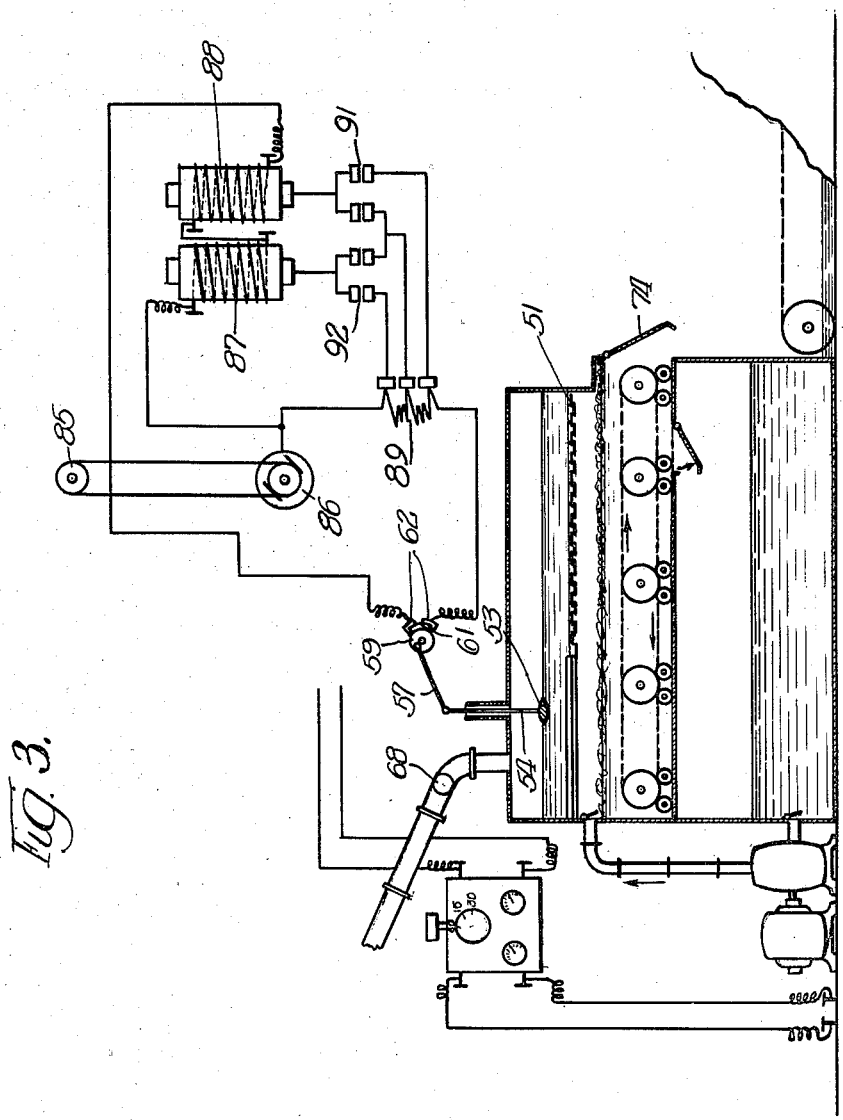
Fig. 3 is a somewhat diagrammatical and fragmentary side elevation similar to Fig. 2 showing still another form of control mechanism.

Referring now to Fig. 3, in which a modified form of the control mechanism for the solidifying apparatus 90 is shown, it will be noted that the valve 68 is no longer controlled mechanically by the float and rod assembly but its position is controlled electrically by the electromagnet 81 which activates the armature 82 which is, in turn, secured by means of a connecting rod 83 to the valve 68. The regulator 84 is utilized to control the energizing of the electromagnet 81 in substantially the same fashion as the electromagnet 65 is controlled by the regulator 64. The operation of these two regulators may be synchronized so that as a result the reciprocal movements of the plate 51 occur only when the chamber 46 is filled to a suitable level. Obviously it might be possible to utilize a single regulator to control the two electromagnets 65 and 81 if desired.

Fig. 4 shows an additional alternative form of the control mechanism for the solidifying apparatus 90. In this form the valve 68 and the gates 73 and 74 together with the plate 51 are mechanically activated by means not shown which are, in turn, operated by a drive wheel 85. The drive wheel 85 is rotated by a pulley associated with the motor 86 which is disposed in the same circuit as the field coils of the electromagnets 87 and 88 which are connected in series. These electromagnets 87 and 88 are adapted to operate the switches 91 and 92 respectively, which, in turn, control the insertion or exclusion of segments of the rheostat 89 in the circuit.

In the drawing and specification, there has been set forth a preferred embodiment of the invention, and although specific terms are employed, they are used in a generic and descriptive sense only and not for purposes of limitation, the scope of the invention being defined in the claims.

What is claimed is:

1. In an apparatus for the preparation of solids containing hydrocarbons, the combination for transforming an emulsion of a colloidal solution and a hydrocarbon into small solid particles comprising a chamber having a perforated bottom adapted to receive charges of said emulsion, a plurality of obturators associated with the perforations in said bottom adapted to allow small particles of said emulsion to pass through said bottom, a second chamber associated with said first mentioned chamber adapted to receive said small particles of said emulsion and to be periodically filled with a solidifying liquid, a conveyor means disposed in said second chamber, a third chamber, means for draining said second chamber into said third chamber at suitable intervals, means for providing an opening at suitable intervals in the outer wall of said second chamber when the latter chamber has been drained, and means for returning the solidifying liquid to said second chamber at suitable intervals.

2. A combination of the character described in claim 1, further comprising control means adapted to be activated by variations in the level of the emulsion in said first named chamber, said control means being adapted to control the charging of said first named chamber with said emulsion and to control the operation of said obturators.

3. A combination of the character described in claim 2, further comprising additional control means adapted to activate said means for draining said second chamber, said means for providing an opening in the wall of said second chamber, said conveyor means in said second chamber, and said means for returning said solidifying liquid to said second chamber, all at suitable intervals.

JEAN PATHUS LABOUR.

REFERENCES CITED

The following references are of record in the file of this patent:

UNITED STATES PATENTS

| Number | Name | Date |
| --- | --- | --- |
| 1,612,167 | Beardsley et al. | Dec. 28, 1926 |
| 1,637,377 | Heicke | Aug. 2, 1927 |
| 2,137,931 | Craven et al. | Nov. 22, 1938 |
| 2,332,671 | Scherer | Oct. 26, 1943 |
| 2,379,816 | Mabbs | July 3, 1945 |
| 2,436,211 | Hart | Feb. 17, 1948 |

FOREIGN PATENTS

| Number | Country | Date |
| --- | --- | --- |
| 860,470 | France | Sept. 30, 1940 |